(12) United States Patent　(10) Patent No.: US 7,616,526 B2
Szajnowski　(45) Date of Patent: Nov. 10, 2009

(54) DETERMINATION OF TIME DIFFERENCE OF ARRIVAL IN DISTRIBUTED SENSOR NETWORKS

(75) Inventor: Wieslaw Jerzy Szajnowski, Surrey (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/513,140

(22) Filed: Aug. 31, 2006

(65) Prior Publication Data

US 2006/0291332 A1　Dec. 28, 2006

Related U.S. Application Data

(62) Division of application No. 10/809,326, filed on Mar. 26, 2004, now Pat. No. 7,170,820.

(30) Foreign Application Priority Data

Apr. 3, 2003　(EP)　.................................. 03252120

(51) Int. Cl.
*G01S 3/80*　(2006.01)
*G01S 5/26*　(2006.01)
(52) U.S. Cl. ......................................... 367/129; 342/90
(58) Field of Classification Search .................... 73/649; 367/127, 129, 56, 57, 58; 342/90
See application file for complete search history.

(56) References Cited

U.S. PATENT DOCUMENTS

| 4,811,308 | A | * | 3/1989 | Michel | ........................ | 367/129 |
| 5,973,998 | A | * | 10/1999 | Showen et al. | .............. | 367/124 |
| 2004/0233785 | A1 | | 11/2004 | Szajnowski | | |
| 2005/0117454 | A1 | * | 6/2005 | Millikin | ..................... | 367/127 |

FOREIGN PATENT DOCUMENTS

| DE | 10027828 A1 | 12/2001 |
| EP | 0410594 A2 | 1/1991 |
| GB | 2298098 A | 8/1996 |
| WO | WO-00/39643 A1 | 7/2000 |

* cited by examiner

*Primary Examiner*—Ian J Lobo
(74) *Attorney, Agent, or Firm*—Birch, Stewart, Kolasch & Birch, LLP

(57) ABSTRACT

An object localizing system comprises sensor devices at different sites, each sensor device being capable of detecting a signal from an object, and control means for repeatedly responding to the outputs of the sensor devices by selecting a sub-set of the devices and determining the amount by which the times at which the devices of the sub-set receive the signal are delayed with respect to each other to enable calculation of the current location of the object. Each sensor device can be switched between a master mode, in which the device is operable to transmit events derived from a signal from an object, and a slave mode, in which the device is responsive to such events from another sensor device for processing its own signal in order to determine the time delay between receipt of the signals by the sensors of the respective devices.

3 Claims, 10 Drawing Sheets

DETERMINATION OF TIME DIFFERENCE OF ARRIVAL IN DISTRIBUTED SENSOR NETWORKS

This application is a Divisional of application Ser. No. 10/809,326, filed on Mar. 26, 2004, now U.S. Pat. No. 7,170,820 the entire contents of which are hereby incorporated by reference and for which priority is claimed under 35 U.S.C. § 120.

FIELD OF THE INVENTION

This invention relates to a method and apparatus for determining the relative time delays between a plurality of signals, and is particularly but not exclusively applicable to a network of distributed passive sensors designed to detect and localise a non-cooperative source of acoustic energy by detecting delays between wideband signals.

BACKGROUND OF THE INVENTION

There are many circumstances in which there is a need to detect, identify, localise and track one or more non-cooperative objects of interest in some specified surveillance area. Such tasks can be performed by suitable active or passive sensors which can extract useful information by collaborative processing of signals reflected or emitted by those objects.

In contrast to applications employing active sensors, such as radar or active sonar, in which the surveillance region of interest is illuminated by an interrogating energy waveform to obtain object-backscattered returns, passive sensors capture only object-generated signals (or object-influenced signals from separate sources). For example, the movement of people, wheeled or tracked vehicles, speedboats or vibrating machinery can all generate wideband acoustic signals, which can be exploited for object detection, localisation and tracking.

As will be described in more detail below, an example in which object detection and localisation is useful is that of security surveillance with a network of distributed acoustic sensors forming an 'acoustic fence'. When an object of interest, such as vehicle, has been detected and localised, the estimated object position can be utilized by security cameras for aiming and zooming in order to enhance the quality of recorded images. Such systems may be installed for monitoring purposes in industrial environments, e.g. to track moving obstacles, or to offer improved continuous surveillance of critical infrastructure, including power grids, power plants, gas and oil pipelines and water systems.

Another application is that of coastguard or littoral surveillance in which speedboats and other surface vessels of interest can be detected and localised by a network of floating buoys employing acoustic sensors and low-power radio transceivers providing an intersensor communication link.

In addition to the above surveillance and reconnaissance applications, in multimedia applications distributed microphone networks are capable of enhancing audio signals for improved intelligibility, and cuing for camera aiming.

When the distance between an acoustic source and the sensors is large, the direction of wave propagation is approximately equal at each sensor (the far-field condition), and the propagating field within the sensor network consists of planar waves. For a far-field source, only the direction-of-arrival (DOA) in the coordinate system of the sensors can be estimated directly from the relative delays of signals captured by sensors at different locations. Such relative delay is commonly referred to as the time difference of arrival, or simply TDOA.

The direction-of-arrival (DOA) measurement restricts the location of the source along a line in the estimated DOA. When multiple DOA measurements are made simultaneously by multiple spatially-separated sensors, a triangulation method may be used to determine a location of the source at the intersection of these lines-of-bearing.

When an acoustic source is close to the sensors (the near-field condition), the wave-front of the received signal is perceptibly curved with respect to the spatial extent of the sensor network. In this case, the propagation direction vectors at each sensor emanate from a common source location, and the set of all TDOA measurements can be utilized for localisation of the near-field source. Suitable algorithms utilizing TDOA measurements to determine the location of the near-field source are known to those skilled in the art.

Irrespective of the far/near-field source condition, the source location is always determined from TDOA estimates which need to be obtained from wideband acoustic signals captured by the sensors.

In a distributed sensor network, any two sensors will capture attenuated and time-shifted replicas, $x_1(t)$ and $x_2(t)$, of the same object-generated signal s(t), where $$x_1(t)=A_1 s(t)+n_1(t) \; x_2(t)=A_2 s(t-\Delta t)+n_2(t)$$

where $A_1$ and $A_2$ scale the amplitude of each signal, and $\Delta t$ denotes the TDOA; waveforms $n_1(t)$ and $n_2(t)$ represent background noise and other interference.

The value of time difference of arrival $\Delta t$ is usually determined by cross-correlating the wideband signals $x_1(t)$ and $x_2(t)$ captured by the sensors, i.e. by performing the operation $$R_{12}(\tau) = \frac{1}{T}\int_0^T x_1(t-\tau)x_2(t)dt$$

where the integral is evaluated over the observation interval of duration T and for a range, $-|\Delta t_{max}|<\tau<|\Delta t_{max}|$, of TDOA values of interest. The value of argument $\tau$ that maximises the cross-correlation function $R_{12}(\tau)$ provides an estimate of an unknown TDOA.

In practice, prior to cross-correlation, the received signals may be suitably pre-filtered to accentuate frequencies for which signal-to-noise ratio (SNR) is highest and to attenuate background noise, thus increasing the resulting overall SNR. A cross-correlator utilizing signal pre-filtering is known in the prior art as a generalized cross-correlator.

The cross-correlation process, including pre-filtering, can also be implemented digitally, if sufficient sampling and quantising of the signal is used.

FIG. 1 is a block diagram of a known system cross-correlating a signal and its time-delayed replica to determine the value of TDOA. Each of the signals $x_1(t)$ and $x_2(t)$ is delivered to a respective filter 102, 104. The filtered version of signal $x_1(t)$ is passed through a variable delay line 106 to one input of a multiplier 108, the other input of which receives the filtered version of signal $x_2(t)$. The output of the multiplier 108 is integrated in a finite-time integrator 110. A peak detector 112 detects a peak in the output of the integrator 110. The position of this peak represents the delay time between the two signals $x_1(t)$ and $x_2(t)$.

Object-generated acoustic signals are classified as wideband signals since the ratio of their highest frequency component to lowest frequency component is relatively large. For example, for the audio range, 30 Hz to 15 kHz, the ratio is 500.

In a case of wheeled and tracked vehicles, dominant frequency components may range from about 20 Hz to 2 kHz, resulting in a ratio of 100.

Not only do acoustic signals emitted by objects of interest occupy a wide frequency range, but they also will manifest a non-stationary and chaotic nature with identifiable intermittent transients. As a result, many known cross-correlation techniques based, explicitly or implicitly, on the assumptions of signal stationarity and noise Gaussianity are only of limited practical use. Furthermore, most practical implementations have to deal with discrete-time samples, so that the optimisation procedures and performance analyses carried out in the continuous-time framework cannot be fully applicable.

It would therefore be desirable to provide a method and an apparatus for determining time difference of arrival (TDOA) in a more efficient way than that provided by the prior art techniques.

SUMMARY OF THE INVENTION

Aspects of the present invention are set out in the accompanying claims.

In accordance with a further aspect of the present invention, wideband signals emitted by an object of interest and captured by a plurality of spatially dispersed passive sensors are processed jointly, first to detect an object, and then to obtain multiple measurements of time difference of arrival (TDOA) with respect to a selected sensor. Next, the multiple measurements of TDOA are utilized for object localisation, for example by applying one of several algorithms known to those skilled in the art. A control means is responsive to the signals generated by the sensors for repeatedly selecting different sub-sets of the sensors in accordance with which of them are receiving relatively strong signals, the object location being determined from the signals provided by the selected sensor sub-set.

According to a still further aspect of the invention, multiple sensor units or devices (at least two and preferably more) each incorporating a sensing means (such as an acoustic transducer) are disposed at different physical locations and are used to detect and locate an object, one of the devices being operable to send signals to one or more other devices to enable them to calculate delays between the time at which said one sensor device has received a signal from an object and the times at which the other sensor devices receive the signal.

In the preferred embodiment, each of the sensor devices can be selectively switched between a mode in which it determines the time delay based on a signal received from another sensor device, and a different mode in which it transmits a signal to other devices. Such an arrangement is particularly advantageous when combined with the feature mentioned above, whereby different sub-sets of the sensors can be selected for object location; the sensor device selected to transmit its signal will depend upon (at least) the selected sub-set (and possibly other factors, such as the relative strengths of the signals received by the sensors of the sub-set).

According to a yet further aspect of the invention, the time difference of arrival (TDOA) is calculated using a technique referred to herein as "crosslation". This is disclosed for the purpose of time difference measurement in WO-A-00/39643, and for analysis purposes in European Patent Application No. 02254612.1 entitled "Signal Statistics Determination". The contents of both these applications are incorporated herein by reference.

The term "crosslation" as used herein refers to a technique whereby predefined (preferably at least substantially a periodic) events which occur in one signal are used to define staggered segments of a second signal, and representations of the staggered segments are then combined. The first and second signals may in fact be the same signal, in which case the resulting combined representation will provide information regarding the statistical properties of that signal, and in particular about the average behaviour of the signal before and after the predefined events. Alternatively the first and second signals may be different signals ("mutual crosslation"), or one may be a delayed version of the other, in which case the combined representation will provide information about the relationship between those signals. For example, if the combined representation contains a feature which would be expected from combining segments associated with multiple predefined events, this may indicate that one of the signals is delayed with respect to the other by an amount corresponding to the position within the representation of that feature.

The technique of crosslation can be implemented by processing the output waveform from one sensor according to signal events occurring in the outputs of another sensor. Accordingly, only one full waveform is required. In situations where the sensors are located remote from each other, this substantially reduces the amount of data required to be transmitted by the sensors and therefore enables the use of the invention in systems having limited communication capabilities, such as simple bandwidth-limited wireless links. A further reduction in data transmission requirements is achieved by using the aspect of the invention mentioned above whereby a TDOA calculation is performed by a sensor device by processing the output of the sensor of that device according to signal events detected by the sensor of another device. In this situation it is merely necessary to transmit data representing the timing of those signal events.

A preferred embodiment of the invention uses a plurality of substantially identical passive sensor devices PSDs, dispersed over some surveillance area of interest, to form a main part of a distributed sensor network which also comprises a data fusion centre DFC. In a security surveillance system, for example, passive acoustic sensors can provide a function of an 'acoustic fence'. Information regarding the presence of an object and its location is passed, for example, to a control system of security cameras for aiming and zooming operations.

Arrangements embodying the invention will now be described by way of example with reference to the accompanying drawings.

DETAILED DESCRIPTION OF PREFERRED EMBODIMENTS

Figure 1:
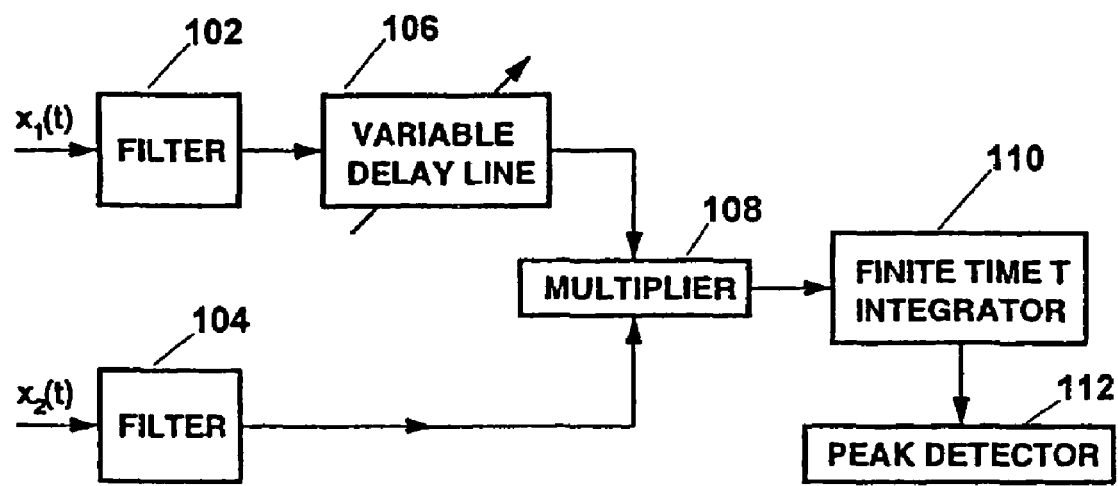
FIG. 1 is a block diagram of a generalised cross-correlator configured according to the prior art to determine the relative time delay between two signals.
Figure 2:
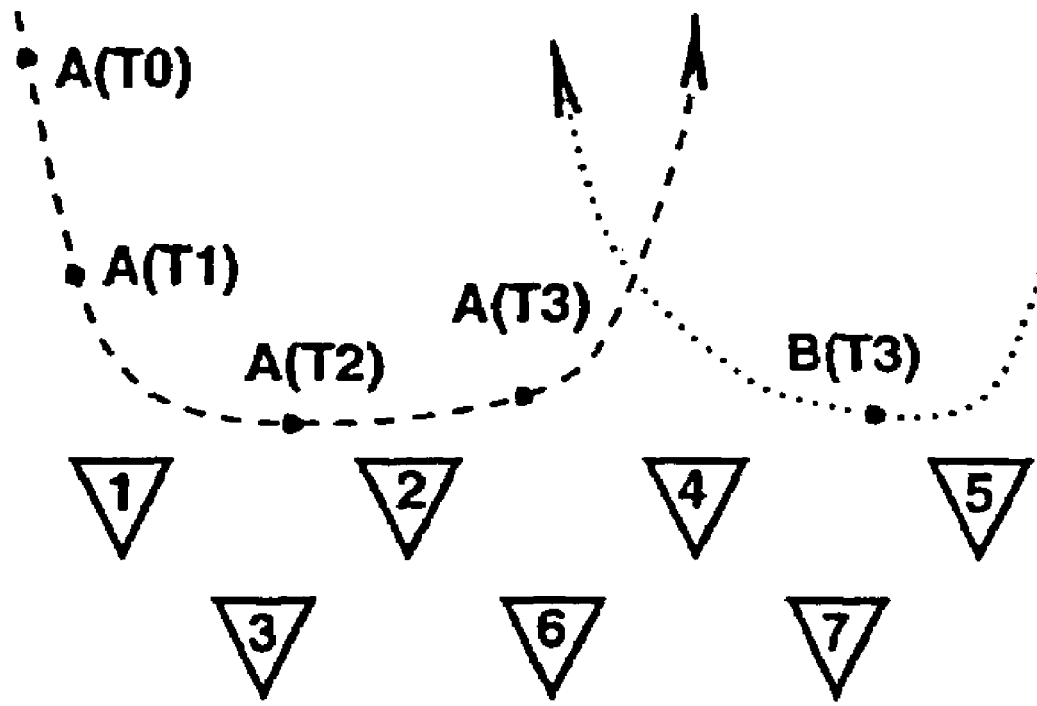
FIG. 2 depicts a sensor network comprising seven passive devices arranged in a regular array, a data fusion centre and two security cameras.
Figure 2:

FIG. 2 is an example of a multi-sensor sensor network with seven passive sensor devices PSDs, each indicated by a respective numbered triangle, arranged in a regular array, and a data fusion centre DFC which sends suitable control signals to two security cameras, CAM1 and CAM2.

All passive sensor devices PSDs are regarded as the nodes of a distributed sensor network, and the data fusion centre DFC may be viewed as a node of another higher-level information network. While the main role of passive sensor devices PSDs is to sense the surveillance area, the data fusion centre DFC performs functions of command, control and computation. It is assumed that there is provided a communication channel in the form of a wired or wireless link, available for information exchange among all the passive sensor devices PSDs and the data fusion centre DFC. It is also assumed that all information exchanges are carried out under the control of data fusion centre DFC.

Figure 3:
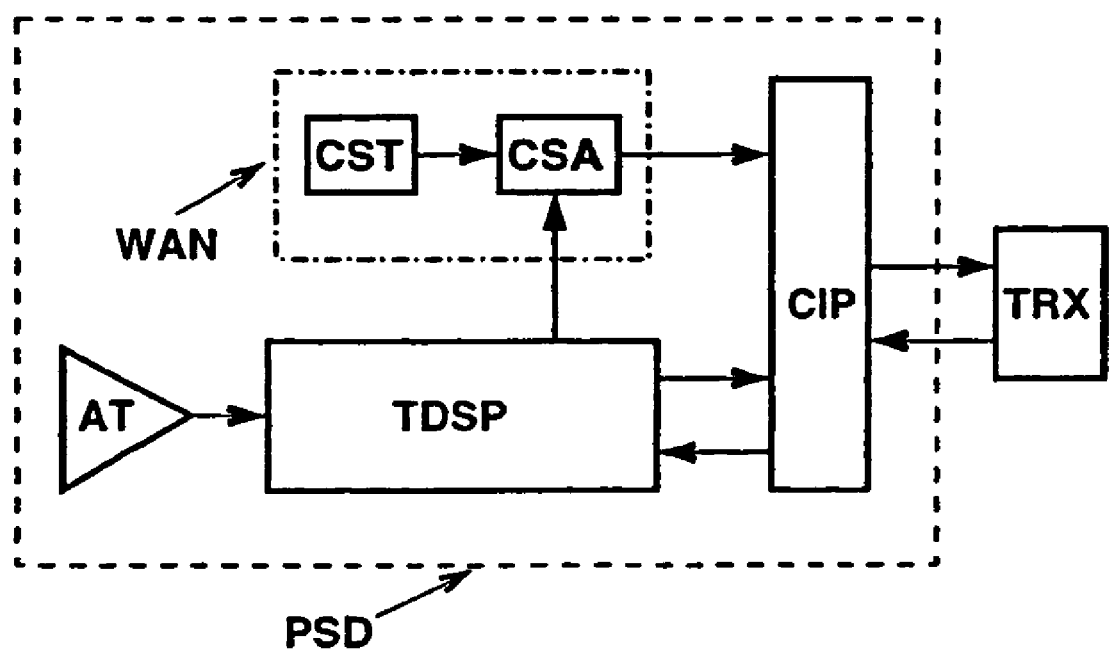
FIG. 3 is a block diagram of a passive sensor device in accordance with the present invention.

FIG. 3 is a block diagram of a passive sensor device PSD incorporating a time-difference-of-arrival signal processor TDSP. The passive sensor device PSD includes a sensor in the form of an acoustic transducer AT with associated signal-conditioning circuits, which sensor can produce an output in response to the presence of an object in its field of view. The passive sensor device PSD also comprises a waveform analyzer WAN and a communication interface processor CIP connected to a suitable radio transceiver TRX.

The signal processor TDSP outputs to the waveform analyzer WAN a signal referred to herein as a "crosslation sum"; this will be explained in more detail below. The waveform analyzer WAN comprises a crosslation sum analyzer CSA and a suitable memory CST storing data used in analysing the crosslation sum CS waveform.

The functions and operations performed collaboratively by the passive sensor devices PSDs and the data fusion centre DFC will be explained with reference to a generic surveillance scenario depicted in FIG. 2, in which a dashed line and a dotted line represent, respectively, the trajectories of two objects, A and B.

According to the preferred embodiment of the invention, each passive sensor device PSD can operate in one of three different modes: detection mode, master mode and slave mode.

In the noise-alone case, each passive sensor device PSD remains in detection mode, and the entire sensor network is said to be operating in DETECT configuration.

In order to be able to detect the presence of a signal-emitting source, the time-difference-of-arrival signal processor TDSP has a means to determine the rate $N(L)$ at which a captured signal crosses, with either a positive slope (an upcrossing) or a negative slope (a downcrossing), a predetermined level L. The value of L is so selected as to ensure that in the noise-alone case, the number of crossings of level L per unit time, i.e. the crossing rate, is small. The values of $N(L)$ registered at each passive sensor device PSD are monitored by the data fusion centre DFC via the communication link. The monitoring process can be regular, i.e., continuous or periodic, or irregular.

The data fusion centre DFC stores data defining a predetermined detection crossing rate $N_{DET}(L)$. As soon as the crossing rate $N(L)$ observed at any passive sensor device PSD exceeds the value of $N_{DET}(L)$, a detection is declared by the data fusion centre DFC in respect of the passive sensor device PSD in which this event has occurred. Detections may also be declared for several passive sensor devices PSDs.

In the example of FIG. 2, it is assumed that at the initial time T0 there are no signal emitting objects in the vicinity of the sensor array, and all the passive sensor devices PSDs are capturing background noise only. The detection event occurs at time T1, when the signal emitted by an approaching object A is sufficiently large to give rise in passive sensor device PSD1 to a crossing rate that exceeds $N_{DET}(L)$. As soon as the detection has been declared, the data fusion centre DFC will send suitable commands to passive sensor device PSD1 and some other selected passive sensor devices PSDs to change their modes of operation.

The passive sensor device PSD in which a detection has been declared, passive sensor device PSD1 in the considered example, will be switched to master mode, and some other selected passive sensor devices PSDs will be switched to slave mode, whereas the remaining passive sensor devices PSDs of the array will continue to operate in detection mode. However, if detections have been declared in several adjacent passive sensor devices PSDs simultaneously, only the passive sensor device PSD with the greatest observed crossing rate will be switched to master mode.

The selection of slave passive sensor devices PSDs is based on both their geographical locations with respect to the master passive sensor device PSD and increased crossing rates observed in those passive sensor devices PSDs. The part of the network comprising a master passive sensor device PSD and slave passive sensor devices PSDs is now operating in LOCALISE configuration, whereas the remaining part of the network continues to operate in DETECT configuration.

It should be noted that separate parts of a distributed sensor network may operate independently at the same time in LOCALISE configuration, when for example there are several signal-emitting objects in the surveillance area. However, there will always be one master passive sensor device PSD per LOCALISE sub-network (subnet).

In the example shown in FIG. 2, at time T1, passive sensor device PSD1, passive sensor device PSD2 and passive sensor device PSD3 will form a LOCALISE subnet with passive sensor device PSD1 being the master, and the remaining passive sensor devices PSDs will form a DETECT subnet.

At time T2, passive sensor device PSD2 becomes the master of a reconfigured LOCALISE subnet with passive sensor device PSD1 and passive sensor device PSD3, and possibly also passive sensor device PSD6, being the slaves.

At time T3, passive sensor device PSD5 may be allowed to become the master of a second LOCALISE subnet with passive sensor device PSD7 being the slave. However, because passive sensor device PSD4 may receive equally strong signals from both the objects, A and B, the data fusion centre DFC, by comparing successively the performance of various sensor configurations, will attempt to form two LOCALISE subnets operating alternately in time:

1. LOCALISE subnet 1, master: passive sensor device PSD5; slaves: passive sensor device PSD4 and passive sensor device PSD7;

2. LOCALISE subnet 2, master: passive sensor device PSD2; slaves: passive sensor device PSD4 and passive sensor device PSD6.

Consequently, during alternate operating periods, the slave passive sensor device PSD4 will be receiving data events from different masters.

It should be noted that the entire sensor network can be reconfigured dynamically by the data fusion centre DFC, depending on the crossing rates observed at individual passive sensor devices PSDs, their geographical locations, and also on other considerations to be discussed below.

Since declaration of detection and network reconfiguration decisions all depend on the observed values of level crossing rate, Example 1 discusses in more detail the difference between crossing rates expected in noise-alone and signal-plus-noise cases.

EXAMPLE 1

Assume that $\sigma_n$ is the rms value of background noise with a rectangular frequency spectrum extending from 0 Hz to 2 kHz. If background noise has a Gaussian distribution, then the expected crossing rate achieves its maximum of 2310 crossings per second for L=0 i.e., the zero crossing rate. When the level L rises gradually to $L=\sigma_n$, $L=2\sigma_n$ and $L=3\sigma_n$, the expected crossing rate will fall to 1340, 312 and 25 crossings per second. If $L=4\sigma_n$, then on average there will be less than one crossing per second.

Suppose now that the crossing level L has been set at $L=4\sigma_n$ and that the detection crossing rate $N_{DET}(L)$ is equal to 1340 to achieve a very small value of the probability of false alarm. Assume also, for illustrative purposes, that an object-generated signal has the same rectangular spectrum as the background noise. In this case, a detection will be declared if the rms value $\sigma_s$ of the signal is approximately at least four times larger than that of the noise.

The increased crossing rates observed at passive sensor devices PSDs adjacent to a master passive sensor device PSD, even those below the selected detection crossing rate $N_{DET}(L)$, may indicate that at least some of those passive sensor devices PSDs can contribute to the collaborative task of object localisation. Therefore, another decision crossing rate, the localisation crossing rate $N_{LOC}(L)$, needs to be selected for efficient network operation in LOCALISE configuration. For example, all passive sensor devices PSDs at which the observed crossing rate N(L) is greater than $N_{Loc}(L)$ equal to, say, $N_{DET}(L)/4$ may be considered as likely candidates to be switched into slave mode and consequently incorporated into a LOCALISE subnet.

When the sensor network is operating in LOCALISE configuration, it may happen that no longer can any of the crossing rates observed in individual passive sensor devices PSDs exceed the selected detection crossing rate $N_{DET}(L)$. The distributed sensor network, although unable to perform object localisation, may still be used for declaring collaborative object detection, if, for example, the sum of crossing rates observed in selected adjacent passive sensor devices PSDs exceeds some other predetermined value $N_{SUM}(L)$.

It may also happen that during the network operation a new master passive sensor device PSD may replace the old one, in accordance with the network rule: only one master passive sensor device PSD per LOCALISE configuration.

Furthermore, passive sensor devices PSDs with extremely low crossing rates may be allowed to exclude themselves from the collaborative localisation task, because they can no longer supply reliable information to the data fusion centre DFC.

The data fusion centre DFC can control the various re-configuration operations mentioned above by using simple logic gates responsive to the outputs of comparators for comparing signals representative of the crossing rates detected at the various sensors with respective thresholds. A suitable structure can readily be designed by anyone skilled in the art.

The passive sensor device PSD modes detection, master and slave, as well as the network configurations DETECT and LOCALISE, will now be described in more detail.

Irrespective of the mode/configuration each passive sensor device PSD always sends to data fusion centre DFC information regarding the crossing rate N(L) determined from a captured signal.

When in detection mode, each passive sensor device PSD performs only a single function of determining the rate N(L) of crossing a level L by a captured signal plus noise or noise alone.

A master passive sensor device PSD in LOCALISE configuration performs the following operations and functions:

1. Detecting the time instants at which the captured signal crosses a predetermined level L, and then forming a sequence of consecutive time intervals, defined by the instants of alternating upcrossing and downcrossings of level L. In the following, those specific instants will be referred to as significant instants. Significant instants are supplied, via the communication link, to all slave passive sensor devices PSDs in order to enable them to perform TDOA determination.

2. Determining the time instants that define the time intervals during which a predetermined number N of significant instants have been detected. Those time instants, referred to as end-of-cycle pulses EC are sent, via the communication link, to all slave passive sensor devices PSDs in order to synchronize their internal data update. The instants at which EC pulses occur may be viewed as a result of 'decimation' of significant instants.

3. Determining the shape of the crosslation sum CS waveform to be used by the crosslation sum analyzer CSA to indicate a specific class OC which best represents the object generating the signal captured by a master passive sensor device PSD. Such classification may be carried out by analyzing a suitable representation of the determined crosslation sum CS using data stored in the memory CST of the waveform analyzer WAN.

The shape of the crosslation sum CS waveform may be regarded as a 'fingerprint' signature used to discriminate between several classes, including a class 'unknown', of signal emitting objects.

The value of index OC, indicating the representative object class, is sent to the data fusion centre DFC via a communication interface processor CIP and a transceiver TRX.

Figure 4:
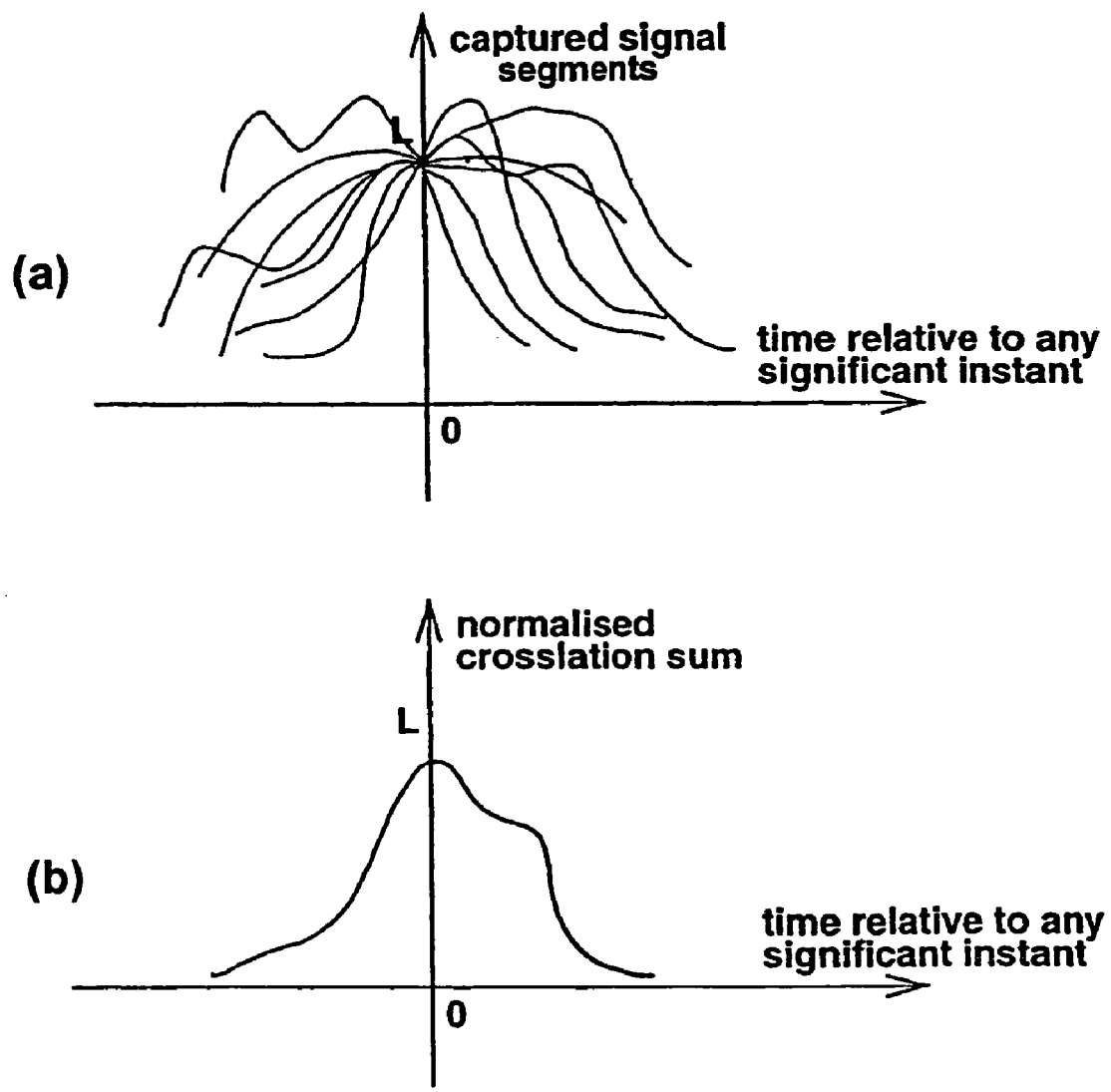
FIG. 4 illustrates schematically the process of forming a crosslation sum waveform from overlapped segments of a signal captured by a passive sensor device.

FIG. 4 illustrates schematically the process of forming a crosslation sum CS waveform from overlapped segments of a signal captured by a master passive sensor device PSD.

FIG. 4(a) shows a group of waveform segments, each segment representing the output of the transducer AT during a respective interval. The segments are selected such that they represent the signal for predetermined intervals before and after the signal level crosses a predetermined threshold L (both upcrossings and downcrossings), by using such events ("significant events") as triggers for a sampling process. The "crosslation sum" is obtained by summing the waveform segments. The resulting waveform is preferably then normalised by dividing the amplitude by the number of waveform segments summed. (This is of course equivalent to averaging the waveform segments; references herein to summing are intended to encompass averaging.) An example of a normalised crosslation sum is shown in FIG. 4(b).

The above functions and operations can only be performed reliably by a master passive sensor device PSD if the signal-to-noise ratio SNR is high. This condition justifies the selection of a master passive sensor device PSD based on the largest observed crossing rate.

A slave passive sensor device PSD in LOCALISE configuration performs the following operations:

1. Summing, at the significant instants supplied by a master passive sensor device PSD, overlapped segments of a captured signal to determine the crosslation sum CS waveform.

In this specific case, the operation of crosslation will be referred to as mutual crosslation, since it is performed at significant instants extracted from a signal different from that being actually processed.

2. Transferring the crosslation sum CS waveform resulting from the summation to the waveform analyzer WAN at the time instants coincident with the end-of-cycle EC pulses supplied by a master passive sensor device PSD.

The waveform analyzer WAN determines both the extreme value (maximum in the present case) of each received crosslation sum CS waveform and the position in time of this value. This information is sent to the data fusion centre DFC via a communication interface processor CIP and a transceiver TRX.

The position in time of the maximum in the crosslation sum CS waveform is a measure of the time difference of arrival TDOA between the master passive sensor device PSD and the slave passive sensor device PSD supplying that crosslation sum CS waveform to crosslation sum analyzer CSA. The maximum value is an indication of the reliability of the time difference measurement.

Figure 5:
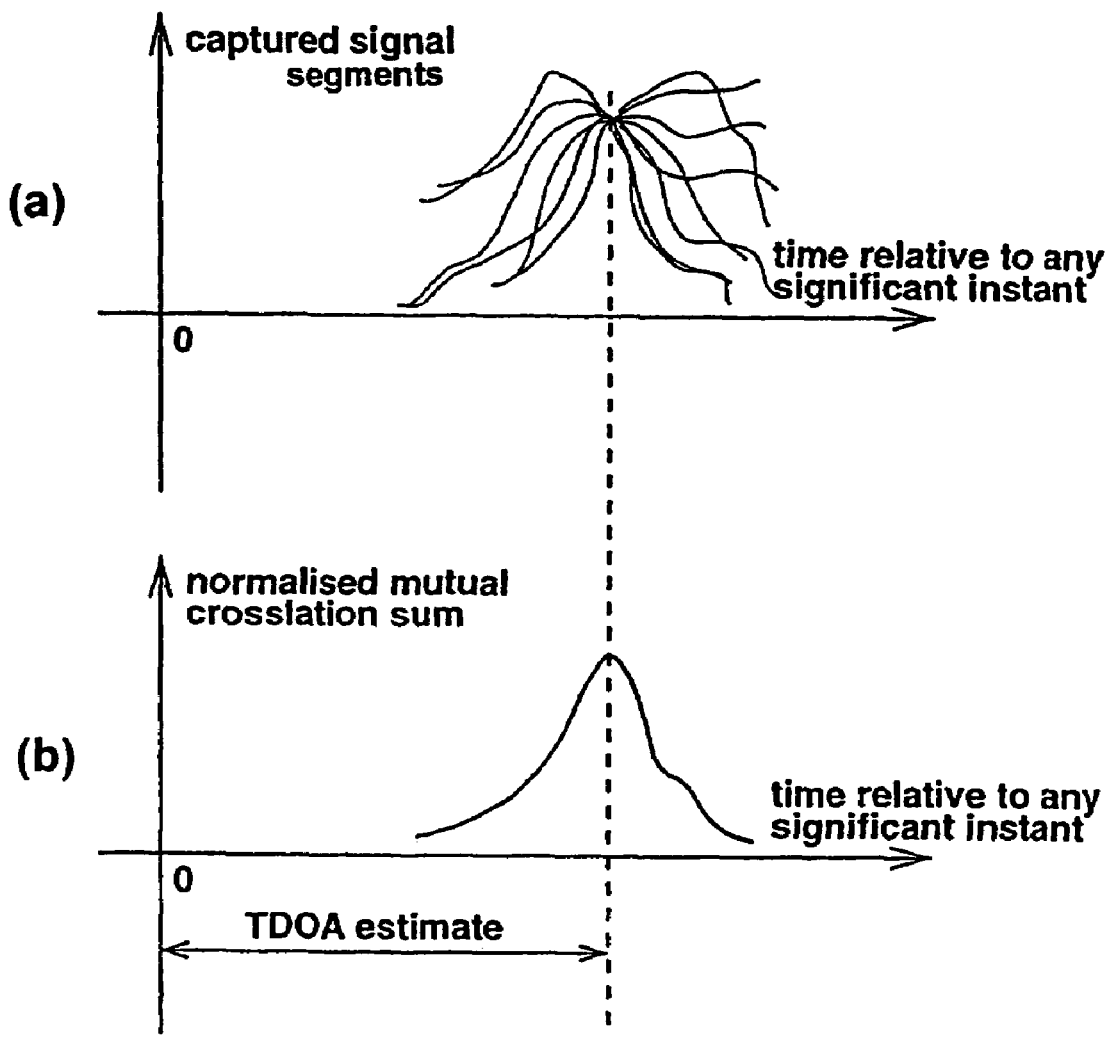
FIG. 5 illustrates schematically the process of forming a mutual crosslation sum waveform in a passive sensor device by averaging overlapped segments of a captured signal at the significant instants supplied by another passive sensor device.

FIG. 5 illustrates schematically the process of forming the mutual crosslation sum CS waveform in a slave passive sensor device PSD by averaging overlapped segments of a captured signal at the significant instants supplied by a master passive sensor device PSD.

FIG. 5(a) shows the respective segments of the sensor output signal (which is preferably a continuous signal), the respective segments comprising successive samples taken over predetermined intervals containing respective crossings of a level L (upcrossings and downcrossings) sensed at the master sensor device. The segments thus formed are then combined and the resulting waveform normalised (similar to the procedure described with reference to FIG. 4) to provide a normalised mutual crosslation sum, an example of which is shown in FIG. 5(b). This will exhibit an amplitude peak at a particular time (on the horizontal axis) which is representative of the delay between the arrival of the signals of the respective master and slave sensor devices. (For some types of signals, the peak may not precisely coincide with the time delays to be determined, but the error is likely to be negligible.) The term "peak" is used herein to refer to both waveforms with local maxima and waveforms with local minima (i.e. "troughs"). For example, by selecting a negative value for level L, the normalised crosslation sum would be a peak having an extreme value which corresponds to a negative local minimum.

Thus, the extreme value of the crosslation sum CS waveform determined by a slave passive sensor device PSD is a measure of the level of this portion of the captured signal which is a time-shifted replica of the signal captured by the master passive sensor device PSD. This property follows from the summation by the slave passive sensor device PSD of the signal segments at the significant instants determined by the corresponding master passive sensor device PSD. Any other signal or noise, unrelated by a simple time shift to the primary signal from which the significant instants have been extracted, will have a pattern of level crossings substantially different from that formed by the significant instants.

Therefore, if, despite a high crossing rate reported by a slave passive sensor device PSD, the extreme value of the crosslation sum CS waveform determined by that slave passive sensor device PSD becomes relatively small or negligible, then there is a possibility that the slave passive sensor device PSD is capturing also signals emitted by objects other than that observed by the master passive sensor device PSD. Consequently, as soon as the crossing rate in the slave passive sensor device PSD has exceeded the detection crossing rate $N_{DET}(L)$, the data fusion centre DFC may attempt to form a new LOCALISE subnet, with the "old" slave passive sensor device PSD playing now the role of master passive sensor device PSD, and some adjacent passive sensor devices PSDs becoming slave passive sensor devices PSDs in this new subnet.

In TDOA applications, mutual crosslation is superior to conventional cross-correlation for the following two main reasons:

1. Computation load: Mutual crosslation does not require multiplications, and the whole function is determined in a parallel manner, thus avoiding a variable delay line.

2. Communication link requirements: When the time difference of arrival TDOA is obtained by cross-correlating signals received at spatially separated sensors, a high fidelity copy of one of those signals must be sent to a cross-correlator; however, a mutual crosslator will require only a sequence of significant instants for its correct operation. For data transmission purposes, significant instants can be conveniently represented by a bipolar binary waveform that asynchronously alternates between its two extreme values at the significant instants.

The difference between the transmitted data formats in these two cases is illustrated by Example 2.

EXAMPLE 2

Assume that a signal being processed has a rectangular frequency spectrum extending from 0 Hz to 2 kHz.

If the signal is sampled only at 4 kHz, and each sample is represented by a 10-bit value, a signal segment of duration of 1 second will be represented by a set of 40,000 bits. This data set will have to be sent, via a suitable communication link, to a cross-correlator for TDOA determination.

As seen from Example 1, even for the lowest possible value of level L, i.e. L=0, the number of significant instants which need to be sent during 1-second interval is equal to 2310. A binary waveform representing those significant instants can be transmitted in a convenient manner by applying a bipolar phase or frequency modulation.

Therefore, mutual crosslation can use a simple modulation scheme in a communication link provided, for example, by a low-cost radio transceiver.

A data fusion centre DFC receives the following information:

1. From each passive sensor device PSD, irrespective of its mode: the rate N(L) of crossing level L by a signal captured by the passive sensor device PSD.

2. From master passive sensor device PSD: the value of index OC, indicating the class most likely to represent the object emitting a signal being captured by the master passive sensor device PSD.

3. From slave passive sensor device PSD: the maximum value and the position in time of this maximum for each crosslation sum CS waveform representing the signal captured by the slave passive sensor device PSD.

The maximum value of the crosslation sum CS waveform is a measure of the level of this portion of the captured signal which is a time-shifted replica of the signal captured by the master passive sensor device PSD.

The position of the maximum of the crosslation sum CS waveform is a measure of the time difference of arrival TDOA between the master passive sensor device PSD and the slave passive sensor device PSD which has determined that crosslation sum CS waveform.

The information received from passive sensor devices PSDs is utilized by the data fusion centre DFC to perform the following operations:

1. Declare a detection or detections, if the detection crossing rate $N_{DET}(L)$ has been exceeded in at least one passive sensor device PSD remaining in detection mode. A detection can also be declared if the sum of crossing rates observed in adjacent passive sensor devices PSDs has exceeded a predetermined value $N_{SUM}(L)$.

2. Select dynamically a master passive sensor device PSD and slave passive sensor devices PSDs for each subnet operating in LOCALISE configuration.

3. Determine the object location by applying to a set of TDOA measurements one of several numerical algorithms known from the prior art (see for example "A Simple and Efficient Estimator for Hyperbolic Location", Y. T. Chan et al, IEEE Transactions on Signal Processing, Vol. 42, No. 8, August 1994.).

4. Depending on the detected object class and/or location, initiate an operation of a suitable actuator, such as cameras CAM1 and CAM2, alarm device etc., and/or send the information on the most probable object class and location to another node of a multi-sensor information fusion network.

It should be noted that an enhanced perception of a region under surveillance can be achieved by combining, or 'fusing', the information provided by the proposed sensor network with complementary information provided by a network comprising other sensors, such as passive infrared sensors.

The proposed sensor network, including its architecture and mode of operation, may be one in which an object of interest is illuminated by a source not collocated with any of the sensors. The illuminating source itself may be an active source used by the system, or it may be a 'source of opportunity', such as a commercial radio or TV transmitter, be it ground-based, airborne or spaceborne.

Figure 6:
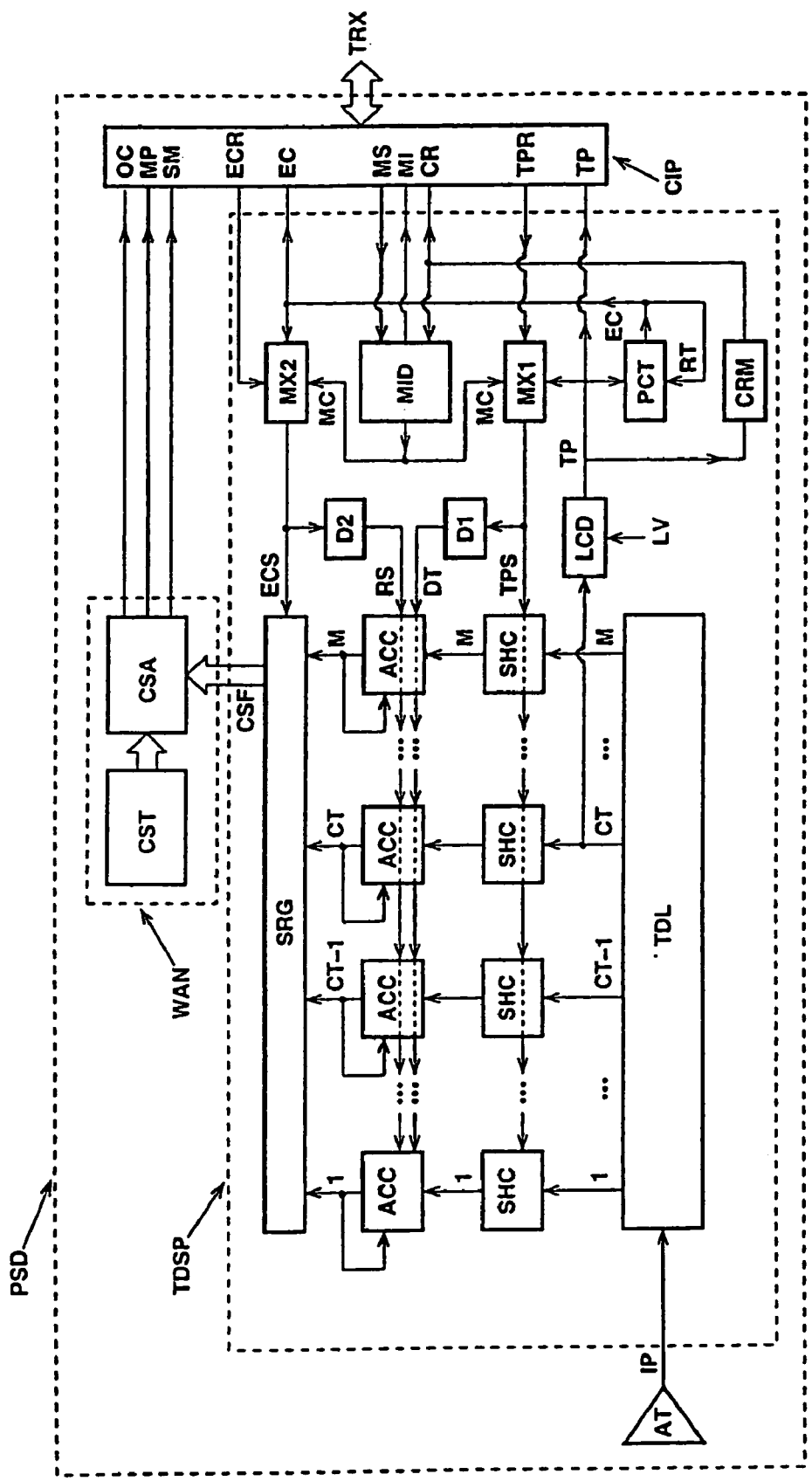
FIG. 6 is a more detailed block diagram of the passive sensor device.

FIG. 6 is a more detailed block diagram of the passive sensor device PSD of FIG. 3.

The time-difference-of-arrival signal processor TDSP comprises a tapped analogue delay line TDL with multiple taps, a level crossing detector LCD, two pulse delay circuits D1 and D2, a pulse counter PCT, a crossing rate monitor CRM, two multiplexers MX1 and MX2, a mode selecting circuit MID, a plurality of sample-and-hold circuits SHC, a plurality of accumulators ACC and a storage register SRG. The storage register SRG may also incorporate a suitable waveform interpolator.

The level crossing detector LCD detects both upcrossings and downcrossings of level L by an input signal provided by the acoustic transducer AT and applied to the input IP of the time-difference-of-arrival signal processor TDSP. The desired crossing level L is set by supplying a suitable threshold value to the input LV of the level crossing detector LCD.

In the configuration shown in FIG. 6, each of M taps of the analogue delay line TDL provides a time-delayed replica of the signal appearing at input IP. At any time instant, the signal samples observed at the M taps of the analogue delay line TDL form jointly a discrete-time representation of a finite segment of the signal propagating along the analogue delay line TDL. Preferably, the relative delay between consecutive taps of the analogue delay line TDL has a constant value.

Figure 7:
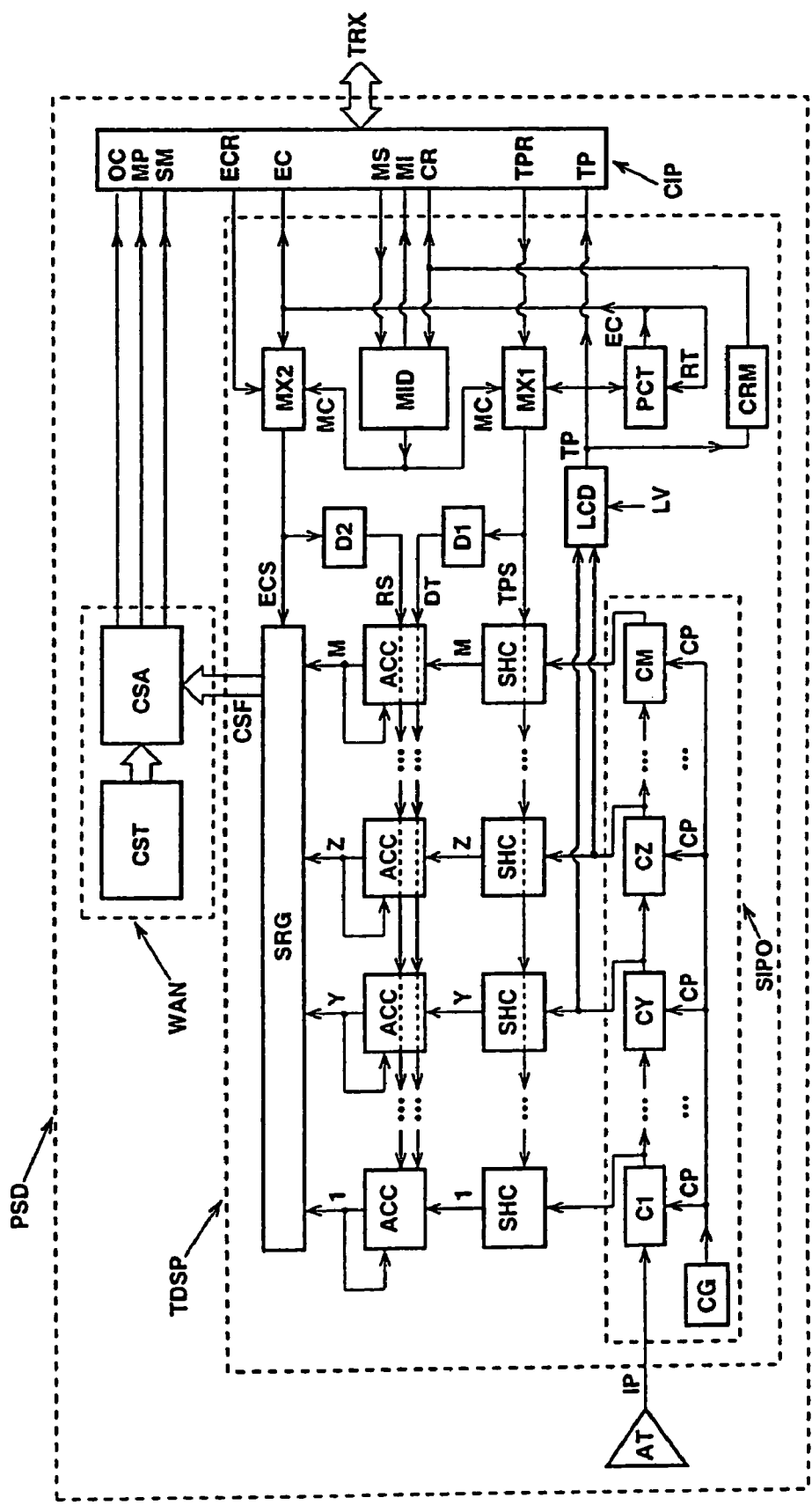
FIG. 7 is a detailed block diagram of a modified passive sensor device.

FIG. 7 is a block diagram of a passive sensor device PSD incorporating a modified version of the time-difference-of-arrival signal processor TDSP. In this configuration, the analogue delay line TDL with multiple taps has been replaced by an analogue or digital serial-in-parallel-out shift register SIPO with a suitable clock generator CG. Also, the level crossing detector LCD has now two inputs instead of one, as will be described below. Other blocks with their interconnections remain unchanged.

An analogue signal captured by the acoustic transducer AT is converted with a signal conditioning circuit into a suitable analogue or digital form and then applied to the serial input IP of the shift register SIPO.

The shift register SIPO consists of M storage cells, C1, C2, . . . , CM. Each cell has an input terminal, an output terminal and a clock terminal CP. The cells are connected serially so that each cell, except for the first one C1 and the last one CM, has its input terminal connected to the output terminal of a preceding cell and its output terminal connected to the input terminal of a succeeding cell. The input terminal of cell C1 is used as the serial input IP of the shift register SIPO. The output terminals of all M cells are regarded as the parallel output terminals of the shift register SIPO. All clock terminals CP of the cells are connected together to form the clock terminal of the shift register.

A sequence of suitable clock pulses is provided by a clock generator CG. When a clock pulse is applied to the clock terminal of the shift register, the signal sample stored in each cell is transferred to and stored by the succeeding cell. The shift register SIPO can be implemented either as a digital device or as a discrete-time analogue device, for example, in the form of a "bucket-brigade" charge-coupled device CCD.

The parallel outputs of the shift register SIPO are connected to respective M sample-and-hold circuits SHC. Two selected adjacent shift register SIPO outputs are also connected to two inputs of the level crossing detector LCD. In the system shown in FIG. 7, the selected outputs are those of cell CY and cell CZ.

If the number M of the shift register SIPO outputs is odd, then preferably one of the two selected outputs is the middle output, i.e. output M+½, of the shift register SIPO. However, if the number of shift register SIPO outputs is even, then the two selected outputs are preferably output M/2 and output M/2+1.

Because the shift register SIPO is operating in discrete time, defined by clock pulses provided by the clock generator CG, the detection of crossing a predetermined level L by signal samples is slightly more complicated than that in a continuous-time case.

However, the crossing detection can be accomplished by applying the following decision rule:

If output of CY<L and output of CZ>L, or if output of CY>L and output of CZ<L, then a level upcrossing has occurred in a "virtual" cell VC "positioned between" cell CY and cell CZ; otherwise no level crossing has occurred.

From statistical considerations it follows that when the period of the clock generator is small compared to the time variability of a signal being processed, the 'time' location of the virtual cell VC is uniformly distributed over the clock period. Consequently, it is assumed that the virtual cell VC is 'located' in the middle between cell CY and cell CZ.

As indicated above, the time-difference-of-arrival signal processor TDSP operates in one of the three different modes: detection mode, master mode and slave mode. The mode requested by the data fusion centre DFC is selected by a control signal appearing at the output MS of the communication interface processor CIP and applied to the mode selecting circuit MID. The control signal is obtained via the communication interface processor CIP and radio transceiver TRX from the data fusion centre DFC.

The mode selecting circuit MID sends appropriate control signals to the two multiplexers, MX1 and MX2, which select suitable paths for various signals used by the time-difference-of-arrival signal processor TDSP to operate correctly in a requested mode. The information about the current mode of the time-difference-of-arrival signal processor TDSP is sent to the data fusion centre DFC via input MI of the communication interface processor CIP and the radio transceiver TRX.

The operations and functions performed by the time-difference-of-arrival signal processor TDSP in each of the three modes will be now described in more detail.

Detection Mode

In this mode, outputs of MX1 and MX2 are disabled. The time-difference-of-arrival signal processor TDSP performs just a single function of monitoring the crossing rate of a captured signal-plus-noise or noise alone.

Figure 8:
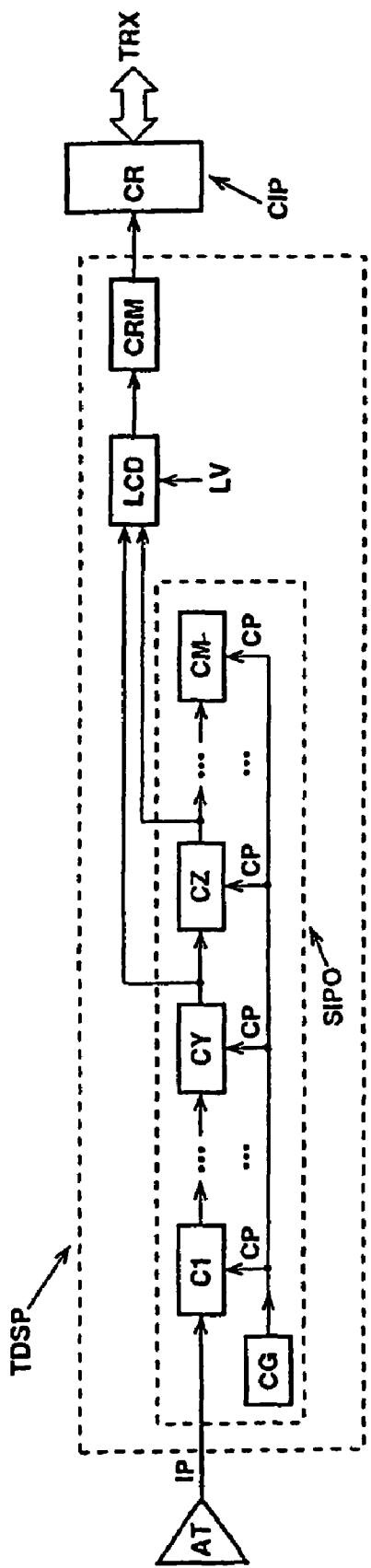
FIG. 8 is a functional block diagram of a time-difference-of-arrival signal processor of the arrangement of FIG. 7 operating in detection mode.

FIG. 8 is a functional block diagram of the time-difference-of-arrival signal processor TDSP operating in detection mode. Each level crossing event is detected by the level crossing detector LCD which produces a pulse at its outputs. The crossing rate monitor CRM determines the average rate N(L) of the received pulses. Preferably, the crossing rate monitor CRM is a moving-average counter with a suitably selected 'time window'. The value of the determined average crossing rate is applied to the input CR of the communication interface processor CIP. The average crossing rate is monitored by the data fusion centre DFC via the radio transceiver TRX. The monitoring process can be regular, i.e., continuous or periodic, or irregular.

Master Mode

In this mode, the time-difference-of-arrival signal processor TDSP determines the crossing rate of a captured signal and also performs crosslation on that signal.

Figure 9:
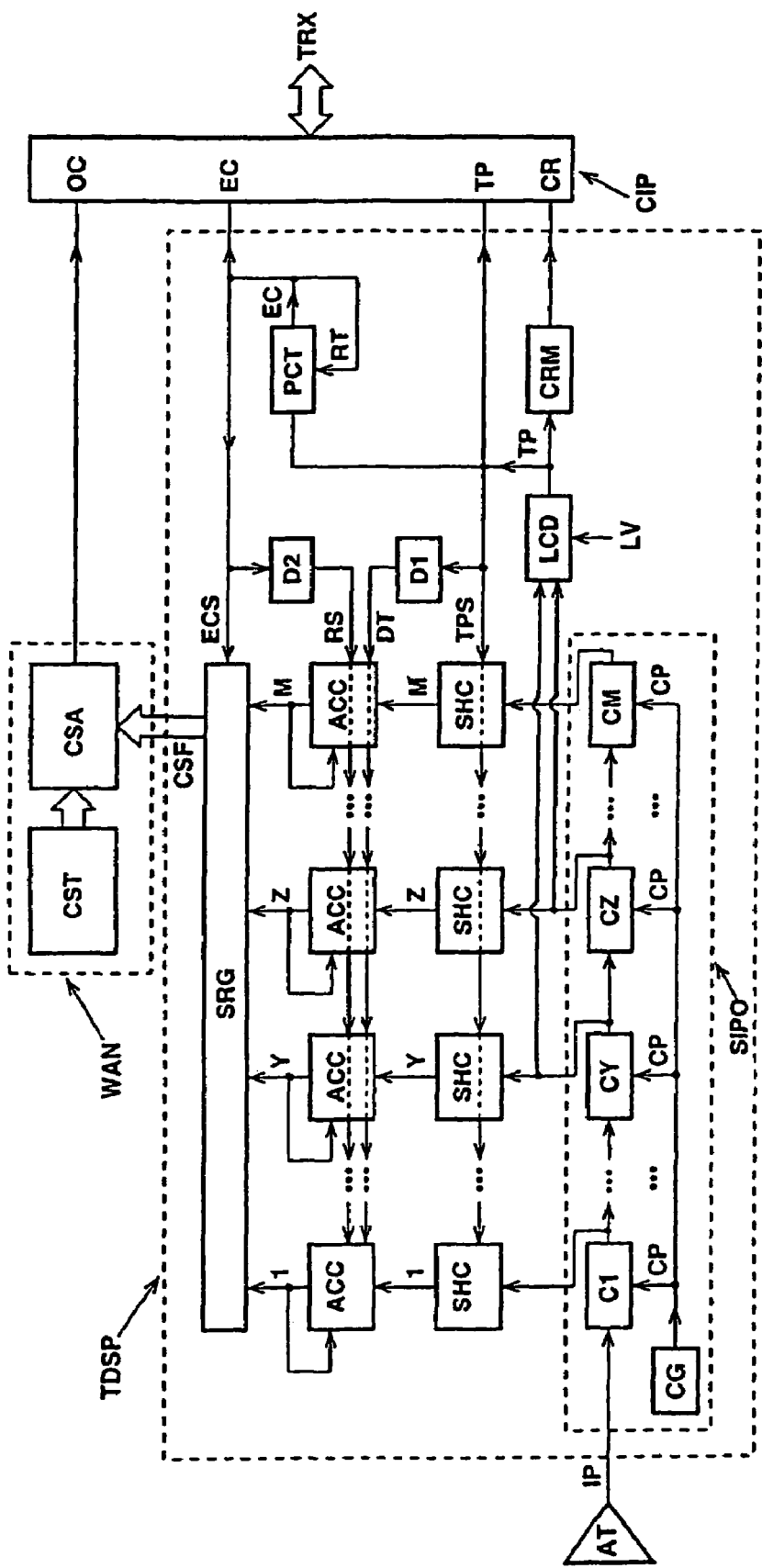
FIG. 9 is a functional block diagram of the time-difference-of-arrival signal processor of the arrangement of FIG. 7, operating in master mode.

In response to a request from the data fusion centre DFC, the mode selecting circuit MID sets via MX1 and MX2 the appropriate signal connections to produce a time-difference-of-arrival signal processor TDSP configuration whose functional block diagram is shown in FIG. 9.

When a crossing of a prescribed level L is detected by the level crossing detector LCD, a short trigger pulse TP is generated at the level crossing detector LCD output.

The trigger pulse TP initiates, via the common TPS input, the simultaneous operation of all sample-and-hold circuits SHC. Each sample-and-hold circuit SHC captures the instantaneous value of the signal appearing at its input and supplies this value to a respective accumulator ACC.

Trigger pulses TP define significant instants required by slave passive sensor devices PSDs in a corresponding LOCALISE subnet. Trigger pulses TP are applied to the input TP of the communication interface processor CIP, and then broadcast via radio transceiver TRX to the slave passive sensor devices PSDs to synchronise the respective processes of mutual crosslation.

The TP also increments by one the current state of the pulse counter PCT. The capacity of the PCT is equal to a predetermined number N of level crossings. The TP is also applied to a suitable pulse delay circuit D1 whose delay is preferably equal to the settling time of the sample-and-hold circuits SHC.

A delayed trigger pulse DT obtained from the delay circuit D1 initiates, via the common input DT, the simultaneous operation of all accumulators ACC driven by respective sample-and-hold circuits SHC. The function of each accumulator ACC is to perform addition or averaging of all N samples appearing successively at its input during one full operation cycle of the crosslation process.

When a predetermined number N of level crossings has been detected by the level crossing detector LCD, and registered by the pulse counter PCT, an end-of-cycle EC pulse is produced at the output of the PCT. The EC pulse resets the PCT, via the input RT, and it also initiates, via input ECS, the transfer of the accumulators' contents to the storage register SRG. Each EC pulse, suitably delayed by the pulse delay circuit D2, sets all the accumulators ACC to their initial zero state via the common input RS. Shortly after the occurrence of the EC, a discrete-time version of the determined crosslation sum CS waveform is available at the output CSF of the storage register SRG.

When no waveform interpolation is used in the register SRG, the determined crosslation sum CS waveform is represented by M values. However, some additional signal processing may be performed in the register SRG to produce an interpolated (smoothed) representation of the CS waveform comprising more than M primary values supplied by the accumulators ACC.

The CS waveform is transferred to the waveform analyzer WAN whose output, connected to the input OC of the communication interface processor CIP, is sent to the data fusion centre DFC via a transceiver TRX. As described above, the value of index OC indicates a specific class which best represents an object generating the signal captured by a master passive sensor device PSD.

End-of-cycle pulses EC are required by slave passive sensor devices PSDs forming a corresponding LOCALISE subnet. EC pulses are applied to the input EC of the communication interface processor CIP, and then broadcast via radio transceiver TRX to the slave passive sensor devices PSDs in order to synchronize their internal data update.

While in master mode, the time-difference-of-arrival signal processor TDSP is also monitoring the crossing rate of a captured signal, in the same manner as in detection mode. The determined crossing rate is applied to input CR of communication interface processor CIP.

Slave Mode

In this mode, the time-difference-of-arrival signal processor TDSP determines the crossing rate of a captured signal and also performs the operation of mutual crosslation on that signal by utilizing significant instants and end-of-cycle pulses provided by a suitable master passive sensor device PSD.

Figure 10:
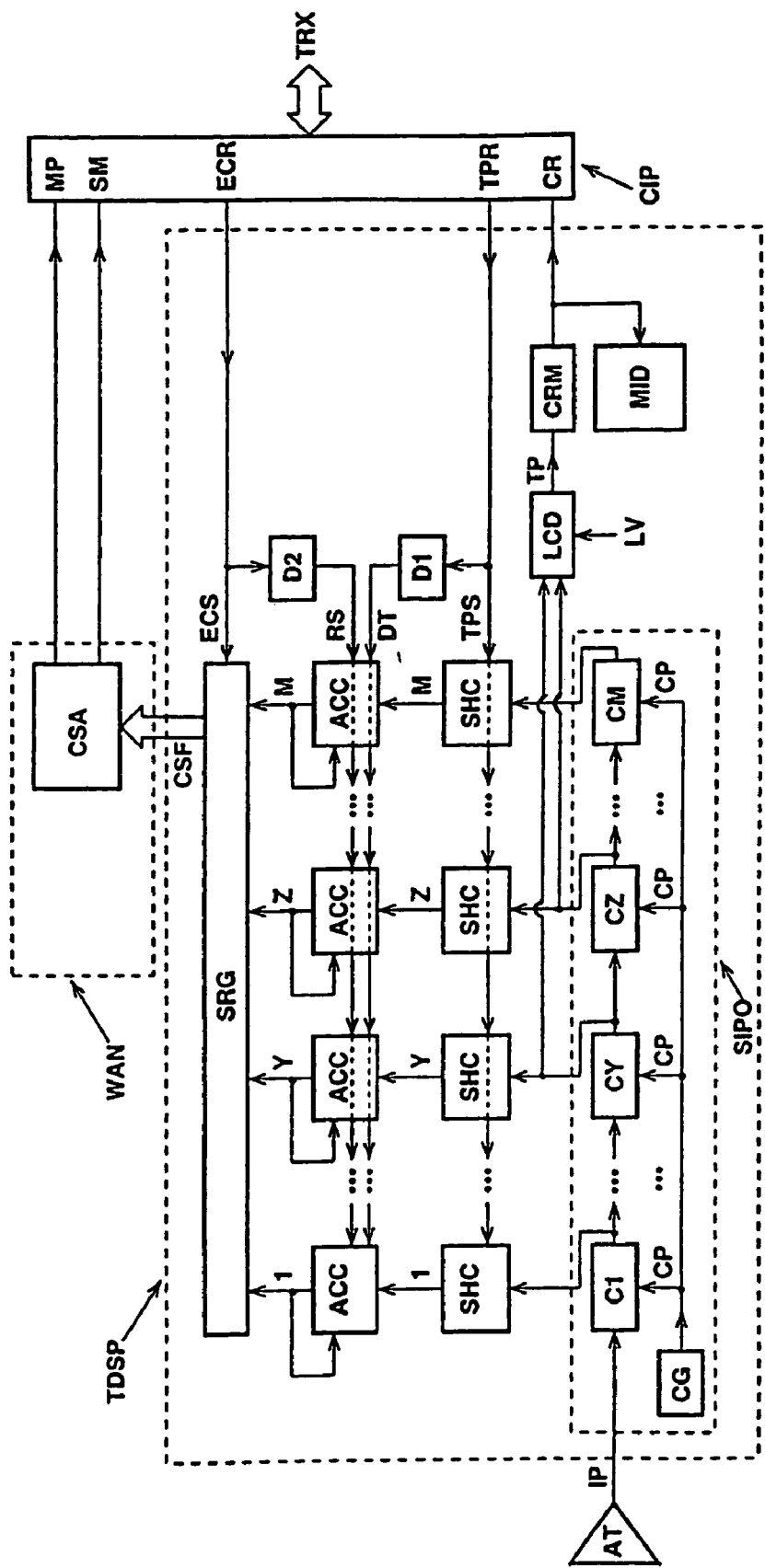
FIG. 10 is a functional block diagram of the time-difference-of-arrival signal processor of the arrangement of FIG. 7, operating in slave mode.

In response to a request from the data fusion centre DFC, the mode selecting circuit MID sets via MX1 and MX2 the appropriate signal connections to produce a time-difference-of-arrival signal processor TDSP configuration whose functional block diagram is shown in FIG. 10.

Each significant instant, received from the TPR output of the communication interface processor CIP, initiates, via the common TPS input, the simultaneous operation of all sample-and-hold circuits SHC. Each sample-and-hold circuit SHC captures the instantaneous value of the signal appearing at its input and supplies this value to a respective accumulator ACC.

A delayed trigger pulse DT obtained from the delay circuit D1 initiates, via the common input DT, the simultaneous operation of all accumulators ACC driven by respective sample-and-hold circuits SHC. The function of each accumulator ACC is to perform addition or averaging of all samples appearing successively at its input during one full operation cycle of the mutual crosslator system.

Each end-of-cycle pulse, received at output ECR of communication interface processor CIP, initiates, via input ECS, the transfer of the accumulators' contents to the storage register SRG. Each ECR pulse, suitably delayed by the pulse delay circuit D2, sets all the accumulators ACC to their initial zero state via the common input RS. Shortly after the occurrence of the ECR, a discrete-time version of the determined mutual crosslation sum waveform is available at the output CSF of the storage register SRG.

When no waveform interpolation is used in the register SRG, the determined mutual crosslation sum waveform is represented by M values. However, some additional signal processing may be performed in the register SRG to produce an interpolated (smoothed) representation of the mutual crosslation sum waveform comprising more than M primary values supplied by the accumulators ACC.

The mutual crosslation sum waveform is transferred to the waveform analyzer WAN whose outputs, connected to inputs MP and SM of the communication interface processor CIP, are sent to the data fusion centre DFC via a transceiver TRX.

As described above, the position MP of the maximum in the waveform is a measure of the TDOA between the master passive sensor device PSD and the slave passive sensor device PSD supplying that waveform to waveform analyzer WAN. The maximum value SM of the waveform is a measure of the level of this portion of the captured signal which is a time-shifted replica of the signal captured by the master passive sensor device PSD.

The determined average crossing rate is supplied to the mode selecting circuit MID to enable passive sensor devices PSDs with extremely low crossing rates to exclude themselves from the collaborative localisation task, when they can no longer supply reliable information to the data fusion centre DFC.

In the above embodiment, object detection and location is achieved using acoustic waves; this is particularly advantageous, because delays arising in the transmission of representing signal events are negligible having regard to acoustic frequencies. However, the invention is also applicable to other types of signals.

In the above embodiment, one signal is analysed to determine the times at which a predetermined level is crossed, so as to generate event data, for example in the form of an event stream. This data is used to segment a second signal, and the derived signal segments, corresponding to both the upcrossing events and the downcrossing events in the first signal, are summed. The resultant waveform exhibits a substantially unipolar shape from which a position corresponding to the delay between the two signals can be readily determined. In the preferred embodiment, the position is found by locating a peak of the resultant waveform, the peak having a position corresponding to the delay between the two signals and an amplitude representing the reliability of the delay measurement. However, various other techniques could be used to find the delay, such as locating the centre of gravity of the shape, or the median value (corresponding to the location at which the area of the shape is divided equally into two).

As indicated above, the invention can be used for object detection, location and/or tracking. It is applicable to systems which determine the bearing of an object, as well as systems which detect the actual position of an object, and the term "location" is to be interpreted accordingly.

Although the invention has been described in the context of locating an object movable within a plane, such as a horizontal plane, it is of course also applicable to the detection and/or tracking of objects located anywhere in three dimensions.

The invention is of course applicable to systems which use sensors responsive to signals other than acoustic signals. For example, it would be possible to use electromagnetic sensors which detect objects which emit or reflect suitable electromagnetic noise-like signals.

The foregoing description of preferred embodiments of the invention has been presented for the purpose of illustration and description. It is not intended to be exhaustive or to limit the invention to the precise form disclosed. In light of the foregoing description, it is evident that many alterations, modifications, and variations will enable those skilled in the art to utilize the invention in various embodiments suited to the particular use contemplated.

The invention claimed is:

1. In an object location system comprising multiple sensor devices at different sites, a sensor device comprising:
a sensor for sensing a detection signal from an object;
means for transmitting data signals to other sensor devices of the object location system;
means for receiving data signals from other devices of the object location system; and
means responsive to one of the data signals, which include control data, received by the receiving means to switch the sensor device between:
(a) a master mode, in which the sensor device is operable to transmit data derived from said sensed detection signal using the transmitting means; and
(b) a slave mode, in which the device is operable to process the sensed detection signal in accordance with the data received, via the receiving means, from one of the multiple sensor devices in the master mode in order to determine a time delay between arrival of the detection signal at the sensor device and arrival of the detection signal at the one of said multiple sensor devices in the master mode, and to transmit data representative of the determined time delay using the transmitting means.

2. A sensor device as claimed in claim 1,
wherein, in the master mode, the device is operable to transmit data indicative of the time at which predetermined events occur within the sensed detection signal, and
wherein in the slave mode the device is operable to use said data received from said sensor device in the master mode to define segments of the sensed detection signal which are staggered with respect to each other by intervals corresponding to the delays between successive events defined by said received data, to form a combination of the said defined segments, and to determine, from the position of a feature within said combination, said time delay.

3. A sensor device as claimed in claim 2,
wherein the predetermined events correspond to times at which the level of the sensed detection signal increases above and decreases below a predetermined level, and wherein the said combination is formed by summing the defined segments.

* * * * *